Jan. 15, 1952 R. A. PETERSON ET AL 2,582,560
ADJUSTABLE METAL STRAIGHTENER AND ANVIL
Filed June 27, 1947
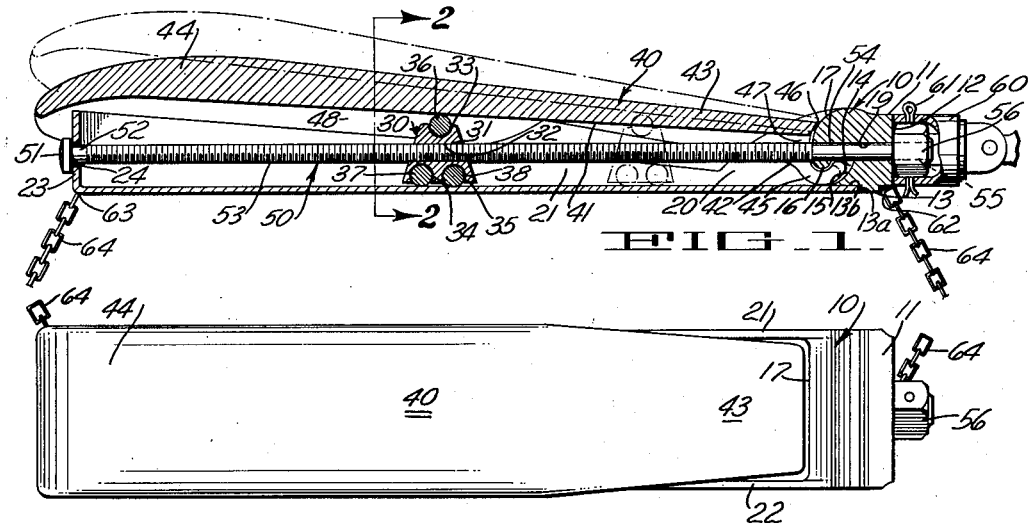
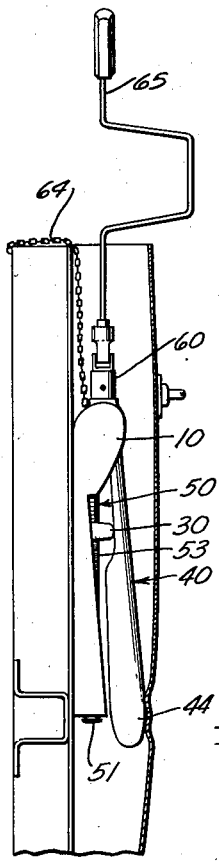
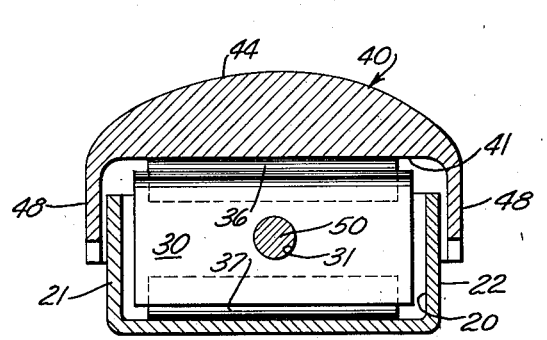
INVENTOR.
RUSSELL A. PETERSON
LEWIS J. HOWELL
BY
Joseph B. Gardner
their atty.

Patented Jan. 15, 1952

2,582,560

UNITED STATES PATENT OFFICE 2,582,560

ADJUSTABLE METAL STRAIGHTENER AND ANVIL

Russell A. Peterson, Berkeley, and Lewis J. Howell, Oakland, Calif.

Application June 27, 1947, Serial No. 757,494

2 Claims. (Cl. 81—15)

1

The present invention relates to the art of working malleable metals and relates particularly to apparatus of novel construction whereby buckled sections and dents in sheet metal panels can be eliminated and the smooth contour of the panel restored without the necessity of separating the metal panel from attachment with its base structure for rolling and smoothing.

More particularly, the invention contemplates mechanical forcing means designed to facilitate insertion into hollow bodies such as automobile door compartments, body recesses and the like and which exerts pressure outwardly to force a deformed inwardly extending section back into substantially its original plane. Still more particularly the invention relates to means for exerting expansive force which can be inserted in the narrow space between the internal frame structure of an automobile door and the outside metal skin surface of the door.

It has heretofore been the practice when automobiles have been in accidents, and the metal surface of the doors have been dented or buckled, to remove the door bodily for disassembly. The metal skin section is usually then removed from the door and the smooth contour of the deformity reestablished by rolling or by beating out the dents with rubber mallets. This mode of operation is expensive because of the time required for disassembly, working the metal and then reassembling the door. In addition, the automobile cannot be operated safely while the door is removed.

One object of the present invention, therefore, is to provide means for restoring smooth contour to metal surfaces in a minimum of time.

Another object of the invention is to provide means for restoring smooth contour to metal surfaces without separating or removing the damaged section from its associated structure.

Another object of the invention is to provide compact means, for exerting expansive force, capable of insertion through a constricted access opening of a hollow space between wall surfaces, one wall of which is a malleable metal, as for example in the structure of an automobile door.

Another object of the invention is to provide means for introducing controlled expansive force into remote and difficultly accessible places.

Still another object of the invention is to provide means, in a device of the character described, for exerting a maximum of force with a minimum of stress on the operating parts of the device.

Still another object of the invention is to

2 provide an adjustable force exerting member free from bearings or pivot pins which might be damaged by excessive shear stresses during application of abnormal pressure to the malleable metal.

Another object of the invention is to provide a light weight, portable and adjustable reforming anvil capable of withstanding the shock of hammering without serious danger to its operating parts.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a vertical sectional view of the apparatus of this invention.

Figure 2 is an enlarged vertical sectional view thereof taken along the line 2—2 of Figure 1.

Figure 3 is a top plan view of the apparatus.

Figure 4 is a side view of in elevation of a device embodying features of the present invention.

Briefly stated the present invention comprehends a compact apparatus having a moving arm retractable to a position substantially parallel to a base, allowing for insertion of the apparatus into a compartment through a constricted access opening. When inserted into the compartment, the apparatus can be adjustably positioned by supporting lines and the moving arm extended into contact with a wall surface of the compartment while maintaining the degree of pressure exerted against the wall under absolute control. This compact apparatus comprises a base, one end of which serves as a fixed pivot means, a pivotable member acting in cooperation with this pivot means, a channel guide in said base so positioned as to guide reciprocable traveling means in its motion, the position of said traveling means determining the position of the pivotable member and, accordingly, the pressure exerted against the wall with which the pivotable member comes in contact.

Referring now in detail to the form of the invention illustrated in the drawing, it will be seen that the invention comprises a head member 10, having a face 12 which is sufficiently flat or machined to provide a smooth bearing surface.

The head member 10 has a shoulder 13 extending around two sides and the bottom of the former, composed of two right angled surfaces 13a and 13b. The underside of the head member 10 is provided with a transversely extending arcuate recess 14 and adapted to cooperate with a spreader arm unit 40 hereinafter described. The concave surface portion 15 of the arcuate recess 14 terminates at the aforesaid shoulder surface 13b. The convex surface 16 of the recess 14 joins a convex surface 17 in forming a continuous rounded male hinge element which terminates at the flat top surface 11 of head member 10. The head member 10 is additionally provided with a bore 19 extending therethrough perpendicularly to the face 12.

Mounted on the head member 10, so as to form a press fit at the shoulders 13 is a guide channel 20 of suitable thickness and external shape but shown here as a channel with side walls 21 and 22. The channel is closed at the end by a suitable wall 23 preferably formed integrally therewith. The channel 20 may be additionally secured to the head member 10 to form a semi-permanent base unit, by suitable attaching means such as screws if desired. The wall 23 is breached by an aperture 24 which is in axial alignment with the bore 19 of the head member 10.

Seated in the guide channel 20 is traveling means 30 such as a dolly for which the channel forms a runway and guide. The dolly 30 is provided with a bore 31 arranged coaxially with the aperture 24 of the wall 23 and the bore 19 of the head member 10. Said bore 31 is internally threaded at 32 for cooperation with actuating means 50 hereinafter described. The dolly 30 is provided with suitable bearing elements, for example three circular seats or sockets 33, 34 and 35 positioned transversely to the axis of bore 31; the socket 33 being substantially enclosed in the bottom thereof. Journaled for rotation in said sockets are rollers 36, 37, and 38 respectively.

The spreader arm or adjustable anvil unit 40, as illustrated in Figures 1, 2 and 3, comprises a flat-bottomed member 41 composed of three sections 42, 43 and 44. In the illustrated form of the invention the section 42 is arranged with a hook 45 adapted to fit in the arcuate recess 14 and with the conforming recessed hinge surface 46 adapted to cooperate with the protruding surface in forming a hinge permitting relative movement between the parts. A slot 47 is provided in the hook 45 in axial alignment with the bore 19 of base element 10. The throat section 43 is of tapering thickness and width. The section 44 which contacts the member to be straightened is preferably of tear drop design longitudinally and, as illustrated in Figure 2, dome-shaped laterally. The section 44 also is of greater width than channel 20 and is equipped with depending sides or flanges 48 which in cooperation with side walls 21, 22, and 23 of channel 20 enclose the moving parts except when the spreader arm is in a substantially wide open position.

The dolly 30, mounted in the channel 10, is actuated by horizontally extending moving means such as shaft 50. The shaft 50 is composed of five sections 51, 52, 53, 54 and 55 and is journaled in the end wall 23 and head member 10. The section 51 of shaft 50 is an integrally formed head of larger diameter than the lead screw. The section 52 is a short and unthreaded portion journaled in the aperture 24. The section 53 is the threaded portion with which the threads 32 of dolly 30 are in mesh. The section 54 is an unthreaded portion of shaft journaled in the bore 19 of the head member 10. The section 55 is preferably a square or polygonal section of shaft extending beyond the head member 10 and adapted for suitable attachment to the head 56.

The head 56 is connected to means whereby it may be rotated comprising a suitable coupling 60 preferably a universal joint restrained by a suitable pin 61. This pin 61 gives a measure of safety in preventing separation of the pressure apparatus from its operating handle.

Generally it is desirable to be able to fix the angular position of the anvil with respect to the metal panel dent. For this purpose, the head member 10 and channel 20 are provided with suitable connectors 62 and 63 respectively for attachment of adjustable length suspending elements 64, such as chains, cables and the like.

Assuming that the parts are positioned substantially as illustrated, the application of pressure to a dented automobile door panel can be accomplished as shown in Figure 4. The complete assembly is lowered into the inside of the door with the anvil base confronting the door frame. The assembly is positioned by means of the chains 64 so that the dome-shaped section 44 of the spreader arm unit 40 is opposite the dented panel section. The spreader arm 40 is raised into contact with the deformed metal by turning the crank 65 which, through the universal joint turns the shaft 50. The threaded shaft draws the dolly 30 toward the head member 10 and causes the arm 40 to pivot about its hinge. When the metal panel has been forced outward by this adjustable reforming anvil, the metal, if necessary, may be pounded into smoothness with rubber mallets or other levelling tools.

Because of the features described above, the device is particularly useful for handling of minor repairs, where, if the damaged metal panel is not removed the straightening tool must be inserted in relatively inaccessible places and must be capable of a delicate control of the expansive force.

We claim:

1. Apparatus for exerting straightening pressure on yieldable deformed metal surfaces comprising a base having a substantially flat channel member closed at one end by a wall, a head member closing the other end of said base and provided with a fixed pivot portion for cooperation with a spreader arm, said spreader arm having a pivotable portion for cooperation with said head member, a dolly having portions arranged to rotate in said channel and other portions adapted to contact and roll along a surface of said spreader arm along the length thereof; a lead screw journaled in the end wall of said channel and extending through the head member; said screw operatively engaging said dolly; a coupling secured to the lead screw at said head member; and means engaging said coupling by means of which said lead screw may be rotated so as to cause said dolly to move along said channel.

2. Apparatus for exerting expansive force on yieldable metal surfaces comprising a base having a channel closed at one end by a wall; a head member closing the other end of said base and provided with an arcuate recess adjacent a protruding hinge surface; a spreader arm having means cooperating with the hinge surface and recess of said head member, means movable in said channel and engageable with said arm along the length thereof for moving and maintaining said arm in a selected fixed angular position with respect to said base, and means carried by said base for effecting longitudinal movement of the arm actuating means, said actuating means including freely rotatable members arranged to roll along the length of said channel and the length of said spreader arm, said spreader arm being movable from a normal position substantially paralleling said channel to selected positions angularly related thereto.

RUSSELL A. PETERSON.
LEWIS J. HOWELL.

REFERENCES CITED

The following references are of record in the file of this patent:

UNITED STATES PATENTS

| Number | Name | Date |
|---|---|---|
| 1,342,025 | Mallove | June 1, 1920 |
| 2,034,076 | Zahner | Mar. 17, 1936 |
| 2,262,385 | Countryman | Nov. 11, 1941 |
| 2,283,089 | Pfauser | May 12, 1942 |
| 2,296,173 | Mandl | Sept. 15, 1942 |
| 2,352,703 | Fries | July 4, 1944 |
| 2,447,401 | Ferguson et al. | Aug. 17, 1948 |

FOREIGN PATENTS

| Number | Country | Date |
|---|---|---|
| 271,310 | Great Britain | May 26, 1927 |